(12) United States Patent
Garcia Reyes et al.

(10) Patent No.: US 12,675,661 B2
(45) Date of Patent: Jul. 7, 2026

(54) BIO-DEGRADABLE ACOUSTO-MAGNETIC LABEL AND METHOD OF MAKING SAME

(71) Applicant: Sensormatic Electronics, LLC, Boca Raton, FL (US)

(72) Inventors: Mario A. Garcia Reyes, Brownsville, TX (US); Mauricio I. Nunez Guzman, Matamoros (MX); Tomas Lamas Monsivais, Matamoros (MX); Eric A. Pacheco Ruiz, Brownsville, TX (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 50 days.

(21) Appl. No.: 18/586,118

(22) Filed: Feb. 23, 2024

(65) Prior Publication Data

US 2024/0289582 A1 Aug. 29, 2024

Related U.S. Application Data

(60) Provisional application No. 63/578,555, filed on Aug. 24, 2023, provisional application No. 63/486,891, filed on Feb. 24, 2023.

(51) Int. Cl.
*G06K 19/06* (2006.01)
*G08B 13/24* (2006.01)

(52) U.S. Cl.
CPC ... *G06K 19/06196* (2013.01); *G08B 13/2422* (2013.01); *G08B 13/2434* (2013.01); *G08B 13/2437* (2013.01); *G08B 13/2442* (2013.01)

(58) Field of Classification Search
CPC ......... G06K 19/06196; G06K 19/0772; G08B 13/2408; G08B 13/2437; G08B 13/2422; G08B 13/2434; G08B 13/2442

USPC ........................................ 235/492; 370/572.1
See application file for complete search history.

(56) References Cited

U.S. PATENT DOCUMENTS

2005/0029702 A1* 2/2005 Deschenes .............. B29C 48/08
264/151
2009/0098320 A1* 4/2009 Cai .................... G08B 13/2408
156/306.6

FOREIGN PATENT DOCUMENTS

CN 205899733 U * 1/2017
CN 113593164 A * 11/2021 ......... G08B 13/2434
CN 113706810 A * 11/2021 ............ B32B 27/36
WO 2021/163677 A1 8/2021
WO 2022/247061 A1 12/2022
WO WO-2025085630 A1 * 4/2025 ........... G09F 3/0335

OTHER PUBLICATIONS

Machine translation of CN 113706810 retrieved from European Patent Office, retrieved Jul. 8, 2025 (Year: 2025).*
Machine translation of CN 113593164 retrieved from European Patent Office, retrieved Jul. 11, 2025 (Year: 2025).*

(Continued)

*Primary Examiner* — Suezu Ellis
(74) *Attorney, Agent, or Firm* — ArentFox Schiff LLP

(57) ABSTRACT

An AM label and method for making the AM label, where the AM label may include a first housing portion comprising a first bio-degradable material and having a side wall defining a cavity. The AM label may include a second housing portion comprising a second bio-degradable material and connected to the first housing portion. The AM label may include an acousto-magnetic resonator sized to moveably fit within the cavity.

21 Claims, 5 Drawing Sheets

(56)          References Cited

OTHER PUBLICATIONS

Machine translation of CN 205899733 retrieved from European
Patent Office, retrieved Jul. 12, 2025 (Year: 2025).*
International Search Report received for PCT Patent Application
No. PCT/US2024/017180, mailed on Jun. 24, 2024, 5 pages.

* cited by examiner

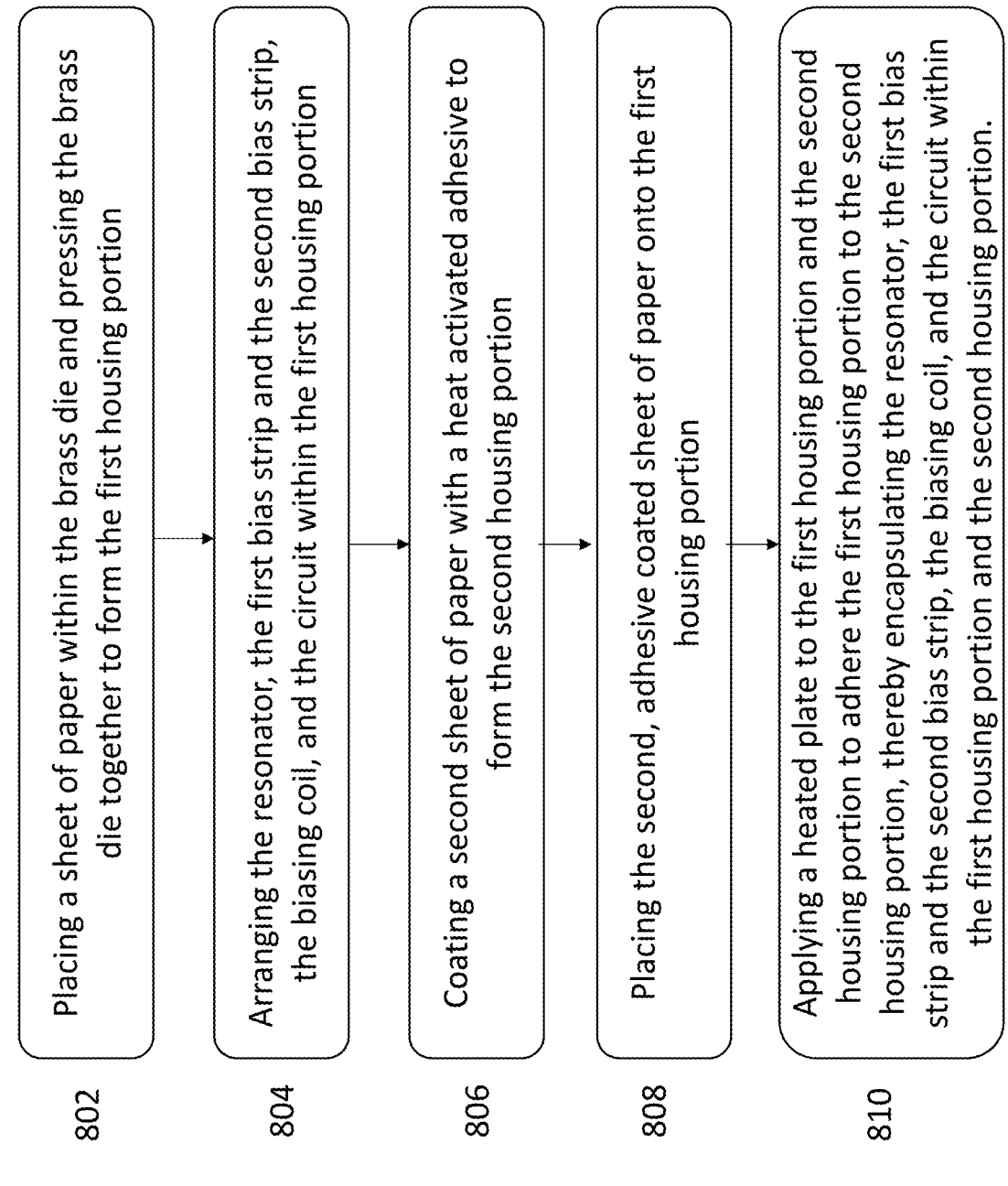

800

802 Placing a sheet of paper within the brass die and pressing the brass die together to form the first housing portion 804 Arranging the resonator, the first bias strip and the second bias strip, the biasing coil, and the circuit within the first housing portion 806 Coating a second sheet of paper with a heat activated adhesive to form the second housing portion 808 Placing the second, adhesive coated sheet of paper onto the first housing portion 810 Applying a heated plate to the first housing portion and the second housing portion to adhere the first housing portion to the second housing portion, thereby encapsulating the resonator, the first bias strip and the second bias strip, the biasing coil, and the circuit within the first housing portion and the second housing portion.

FIG. 8

BIO-DEGRADABLE ACOUSTO-MAGNETIC LABEL AND METHOD OF MAKING SAME

CROSS REFERENCE TO RELATED APPLICATIONS

The present application claims priority to U.S. Provisional Application No. 63/486,891, filed Feb. 24, 2023, and U.S. Provisional Application No. 63/578,555, filed Aug. 24, 2023, both of which are hereby incorporated by reference herein in their entireties.

TECHNICAL FIELD

The present disclosure generally relates to an acousto-magnetic (AM) label or tag, and more particularly to a bio-degradable AM label or tag and a method of making the bio-degradable AM label or tag, such as for use in an electronic article surveillance system.

BACKGROUND

Merchandise items offered by a vendor may be sold in one or more "brick-and-mortar" stores of the vendor. The customer may enter the one or more brick-and-mortar stores of the vendor and purchase the merchandise items. Unfortunately, the vendor and/or the customer may encounter loss due to theft.

To reduce theft, many vendors utilize loss-prevention measures to minimize the number of stolen merchandise. Some loss-prevention measures include security monitoring, inventory tracking, and electronic article surveillance. In particular, electronic article surveillance may include using an acousto-magnetic (AM) label or tag attached to the merchandise. The AM label responds to an interrogation signal from transmitting apparatus situated, for example, either at an exit door of the premises to be protected, or at an aisleway adjacent to a cashier or check out station. A receiving coil, on the opposite side of the exit or aisleway from the transmitting apparatus, receives a signal produced by the AM label in response to the interrogation signal. The presence of the response signal indicates that the AM label has not been removed or deactivated by the vendor, and that the article bearing it may not have been paid for or properly checked out. However, improper disposal of AM labels can be harmful to the environment, as non-ecofriendly materials, such as plastics, are often used to make AM labels.

Thus, improvements are desired in the design and manufacture of acousto-magnetic (AM) labels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an acousto-magnetic (AM) tag, including: a first housing portion including a first bio-degradable material and having a side wall defining a cavity; a second housing portion including a second bio-degradable material and connected to the first housing portion; and an acousto-magnetic resonator sized to moveably fit within the cavity.

In some aspects, the techniques described herein relate to an acousto-magnetic (AM) label, including: a first housing portion including a first bio-degradable material and having a side wall defining a cavity; a second housing portion including a second bio-degradable material and connected to the first housing portion; and an acousto-magnetic resonator sized to moveably fit within the cavity.

In some aspects, the techniques described herein relate to a method of producing an acousto-magnetic (AM) label, including: forming a first housing portion including a first bio-degradable material and having a side wall defining a cavity; forming a second housing portion including a second bio-degradable material and connected to the first housing portion; and placing an acousto-magnetic resonator within the cavity, wherein the acousto-magnetic resonator is sized to be moveably within the cavity.

Additional advantages and novel features of the device, system and method of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein:

FIG. 8 is flow chart of an exemplary method of producing a bio-degradable acousto-magnetic label.

DETAILED DESCRIPTION

Figures 1, 2, 3, 4:
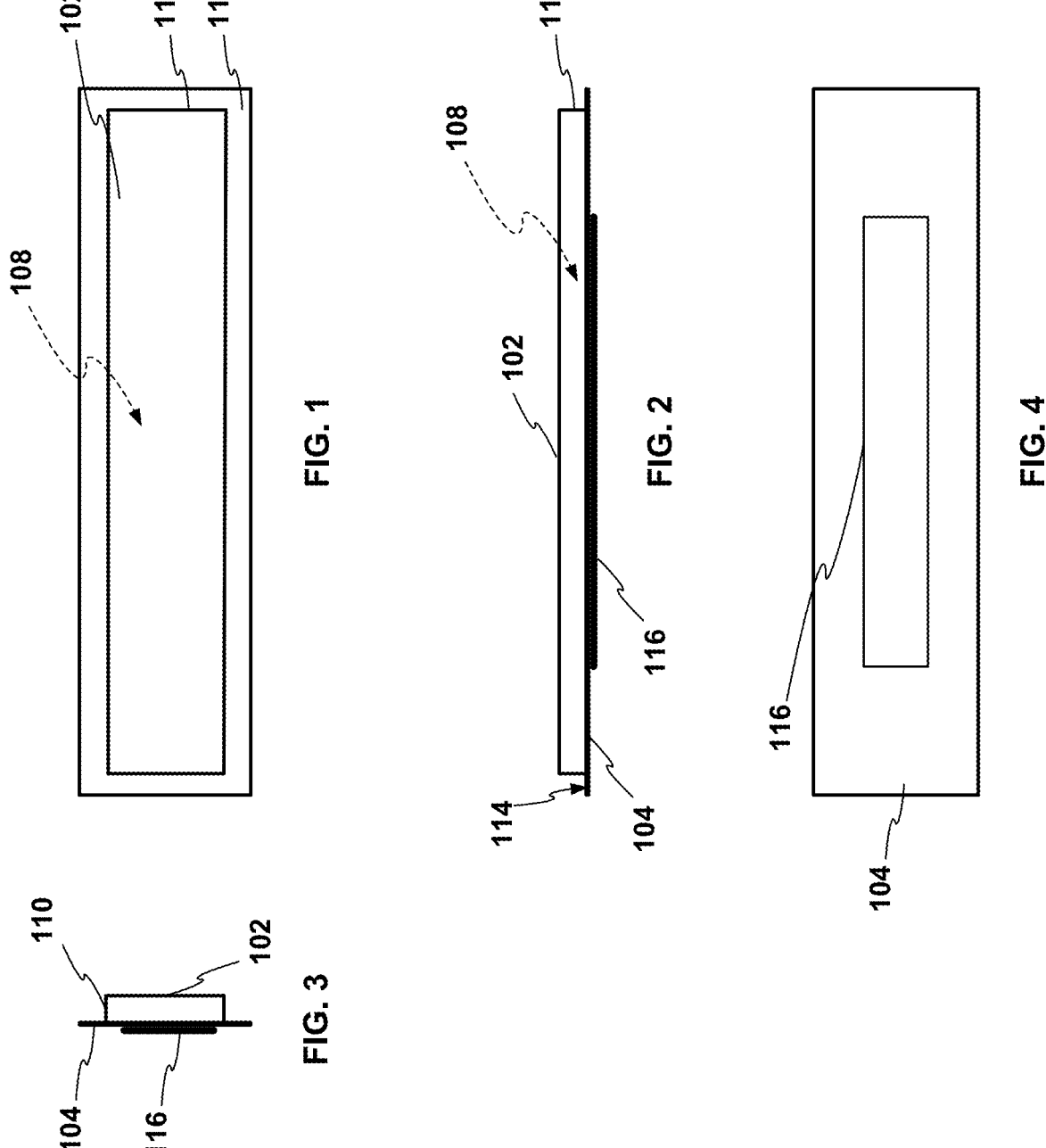
FIG. 1 is a top view of an example bio-degradable acousto-magnetic label according to an aspect of the disclosure.
FIG. 2 is a front side view of the bio-degradable acousto-magnetic label of FIG. 1. The rear side view is a mirror image of the front side view.
FIG. 3 is a left side view of the bio-degradable acousto-magnetic label of FIG. 1. The right side view is a mirror image of the left side view.
FIG. 4 is a bottom view of the bio-degradable acousto-magnetic label of FIG. 1.
Figure 5:
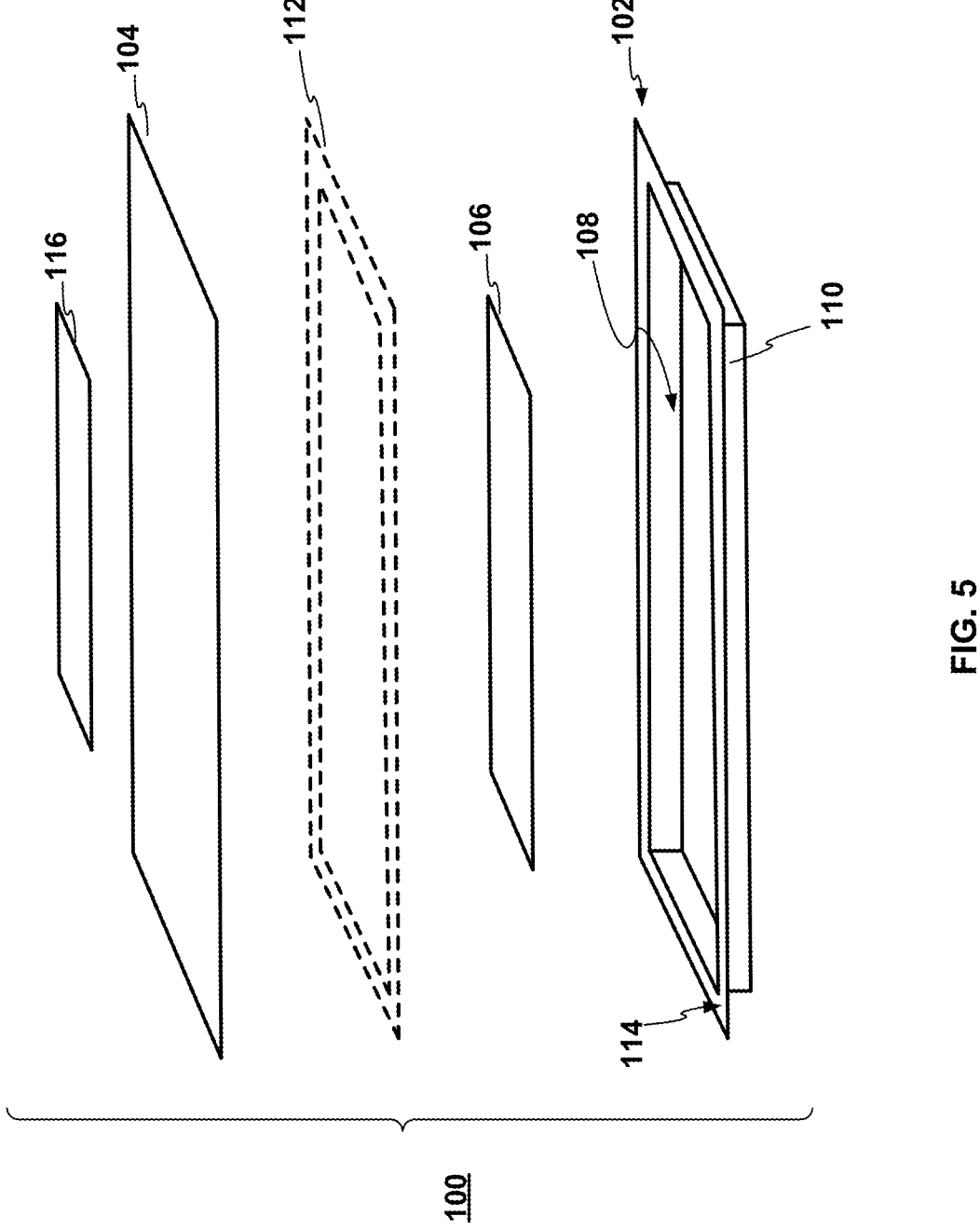
FIG. 5 is an exploded bottom perspective view of the bio-degradable acousto-magnetic label of FIG. 1.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

Aspects of the disclosure include a bio-degradable acousto-magnetic (AM) label or tag (used interchangeably herein) and a method of making an exemplary bio-degradable AM label.

In one example implementation, which should not be construed as limiting, the AM label includes at least a first housing portion having a cavity sized to receive a resonator (e.g., one or more metallic strips), and a second housing portion configured to attach to the first housing portion to form a housing for moveably containing the resonator, thereby defining an AM label. Additionally, the first housing portion and/or the second housing portion may be formed from a bio-degradable material, such as but not limited to a paper material, a fibrous material, and/or a bio degradable resin (i.e., PLA from corn, wheat and sugar cane scratch). In some aspects, the bio-degradable material may be a same material for each housing portion, while in other aspects, each housing portion may be formed from different bio-degradable materials (e.g., different types of bio-degradable materials, or a same bio-degradable material with different characteristics, such as but not limited to thickness, weight, tear-resistance, etc.). For instance, in some cases, it may be more efficient to manufacture the AM tag or label using a same type of material for both the first and second bio-degradable materials. In other aspects, it may be cost efficient to use a different type or thickness of bio-degradable material, for instance for use as the second housing portion, which may be made from a material having less thickness and/or less tear-resistance since a cavity is not formed in the second housing portion. Also, in some aspects, an adhesive may be utilized to connect the first housing portion to the second housing portion.

The described bio-degradable AM label provides numerous advantages over traditional plastic-based AM labels. One advantage relates to the use of a bio-degradable material to form all or at least a portion of the housing of the AM label. The bio-degradable material may include, but is not limited to, a paper material such as Kraft paper, or other similar paper alternatives, a fibrous material, and/or a resin-based material, for example, cardstock paper, cold press substrate, cardboard, and the like. Kraft paper or kraft is paper or paperboard (cardboard) produced from chemical pulp produced in the kraft process (i.e., Kraft paper does not involve extensive bleaching, which decreases the strength of the paper and increases manufacturing costs. Kraft paper may also use resinous pine and bamboo). Such bio-degradable materials are heavy-duty in nature and have high tear resistance (i.e., able to withstand >=60 lb of pressure distributed evenly over the material without causing damages that deteriorates performance), which makes them ideal for label formation. Additionally, the use of a bio-degradable material in the production of the AM labels allows for the use of recycled paper or other eco-friendly materials, which will significantly reduce the environmental footprint generally created during the production of such devices. In one aspect of the disclosure the paper may be flat. In another aspect of the disclosure the paper may have a curve or bend shape.

Referring to FIGS. 1-5, in one example implementation that should not be construed as limiting, a bio-degradable acousto-magnetic (AM) label 100 includes a top housing portion 102 affixed to a bottom housing portion 104 in a manner that sealingly encloses a resonator 106 (see FIG. 5) within a cavity 108 AM label formed in one or both of the housing portions and a bias 116 (see FIGS. 2-5), hereinafter referenced interchangeably as bias or bias magnet, spaced apart from the resonator 106 and located, in some aspects, outside of the cavity 108, affixed on the outside of either the top housing portion 102 or the bottom housing portion 104. More specifically, the bias 116 may be located on either the top side of the bottom housing portion 104 or on the bottom side of the bottom housing portion 104. The top side and the bottom side of the bottom housing portion 104 are on oppositive sides. In another aspect of the disclosure, the bias may be located within the cavity 108 in conjunction with resonator 106. Although a single resonator 106 is illustrated in the Figures, any number of resonators may be implemented, for example, two resonators or three resonators. The resonator(s) 106 may be formed of a metal material, such as an amorphous metal, while the bias 116 may be a magnet or formed of a magnetized and/or ferromagnetic material. For instance, the resonator(s) 106 and bias 116 are configured to have an induced mechanical resonance when subjected to a 58 kHz magnetic field and to provide a magnetic signal when the field is turned off due to the interaction of the resonator(s) 106 and the bias 116. Such a magnetic signal may be received by an antenna of a pedestal of an electronic article surveillance (EAS) security system, and set off an alarm. In one aspect of the disclosure the cavity may be between 1-1.2 mm, but may be up to 2 mm. For example, the cavity 108 may be formed by one or more walls 110 extending from a surface of the top housing portion 102. In one aspect of the disclosure, the AM label 100 may include up to 4 resonators. In some implementations, resonator(s) 106 have a width of 6 mm and a length of up to about 38 mm, depending on the characteristics of the bias 116, which may have a width of 6 mm and a length of about 28 mm. In some implementations, all or some portion of the one or more walls 110 may extend along a respective side of the AM label 100 along a non-linear line (e.g., in a sinusoidal pattern, in a curved or scalloped pattern, in a triangular or square tooth pattern, as viewed from the top looking down), which may increase the structural integrity of the part of the top housing portion 102 that forms the cavity 108. In some implementations, all or some portion of the one or more walls 110 may extend along a respective side of the AM label 100 along a linear line, which may increase the overall size of the cavity 108. Optionally, in some aspects, the bio-degradable AM label 100 may include an adhesive or adhesive layer 112 to affix the top housing portion 102 to the bottom housing portion 104.

Notably, one or both of the top housing portion 102 and the bottom housing portion 104 may be formed from a bio-degradable material, such as but not limited to a paper material, a fibrous material, and/or a resin. As mentioned above, in some aspects, the bio-degradable material may be a same material for each housing portion, while in other aspects, each housing portion may be formed from different bio-degradable materials. For the ease of discussion, the present description may refer to "a bio-degradable material" or "the bio-degradable material" when referring to both the first and second housing portions 102 and 104, but it should be understood that such reference includes the bio-degradable material for each housing portion being the same or different. The housing portions 102 and 104 are plastic free. The bio-degradable material may be a thin sheet material, which in an example of a paper material may be produced by mechanically or chemically processing cellulose fibers derived from wood, rags, grasses or other vegetable sources in water, draining the water through fine mesh leaving the fiber evenly distributed on the surface, followed by pressing and drying. Suitable examples of paper material may include, but are not limited to, Chipboard (kraft) paper, which may be recycled, having a thickness of 15 to 45 points (e.g., where each point is $1/1000^{th}$ of an inch), or more preferably from 20 to 40 points, or more preferably from 25 to 35 points, or more preferably about 30 points. In some aspects, the use of a lower point material, relative to the presently described ranges, may result in the material becoming fragile and breaking during formation. Further, in another aspect, the use of a higher point material, relative to the presently described ranges, may create low detail regarding the shape during formation, and also generate a smaller internal cavity that will decrease the functionality of the AM label.

In some aspects, the bio-degradable material is a white color, while in other aspects it is not bleached, to avoid weakening the structure, or is subject to minimal bleaching such that a color of the top housing portion 102 and the bottom housing portion 104 is non-white, or closer in color to the natural material color than white.

In some aspects, the bio-degradable material includes a heat sealable Kraft paper with a coating of water-based adhesive that is activated by heat. In another aspect of the disclosure, the paper material may be formed by a biodegradable material that is coated with a water-based heat activated adhesive.

The resonator 106 may include a first elongated element of high magnetic permeability ferromagnetic material disposed adjacent to at least a second element of ferromagnetic material having higher coercivity than the first element. When subjected to an interrogation frequency of electromagnetic radiation, the AM label 100 causes harmonics of the interrogation frequency to be developed in the receiving coil. The detection of such harmonics indicates the presence of the AM label 100. Deactivation of the AM label 100 is accomplished by changing the state of magnetization of the second element. Thus, when the AM label 100 is exposed to a direct current (DC) magnetic field, the state of magnetization in the second element changes and, depending upon the design of the AM label 100 being used, either the amplitude of the harmonics chosen for detection is significantly reduced, or the amplitude of the even numbered harmonics is significantly changed. Either of these changes can be readily detected in the receiving coil. In one implementation, the resonator 106 is designed to respond to an interrogation frequency of 58 kHz. In another aspect of the disclosure, other frequencies may be implemented, for example, UHF, HF etc.

The bias or bias magnet 116 may be located on the outside of either the top housing portion 102 or the bottom housing portion 104, as described above. In another aspect of the disclosure, a bias 116 may be located on the top side of the top housing portion 102, and a second bias 116 may be located on the bottom side of the top housing portion 102 or on or within the bottom housing portion 102. Additionally a spacer, not illustrated, may be located between the bias 116 and either the top housing portion 102 or the bottom housing portion 104 to improve performance of the AM label 100 in receiving or transmitting signals. The bias or bias magnet 116 is a rigid or semi rigid ferromagnetic material. The bias 116 may be demagnetized, which in turn alters the resonation of the resonator 106 to a new frequency that will cause deactivation of the AM label 100. Once AM label is deactivated, the AM label 100 will not trigger or react to a security detection mechanism.

In another aspect of the disclosure, the bias 116 may be attached or mated to the top side of the top housing portion 102 or the bottom side of the top housing portion 102 or the bottom housing portion 104 through the use of an adhesive or similar attachment mechanism (i.e. Velcro, glue, a water-based adhesive activated by heat, double sided film tape, varnish coating, or any other type of adhesive). The bias 116 may also be attached before assembly of the AM label 100, and the adhesive used to attach the bias 116 may be cured at the same time that the AM label 100 is being assembled. Alternatively the bias 116 may be attached after the AM label 100 has been fully assembled. The method of assembly and fabrication is described below.

The optional adhesive or adhesive layer 112 may include a solid or liquid layer of any material capable of affixing the top housing portion 102 to the bottom housing portion 104. Suitable examples of the adhesive layer 112 include, but are not limited to, glue, a water-based adhesive activated by heat, double sided film tape, varnish coating, or any other type of adhesive.

In an aspect, the adhesive layer 112 is applied only to a flange area 114 of the top housing portion 102, and a corresponding area on the bottom housing portion 104, such that the cavity 108 remains free of any adhesive in order to allow the resonator 106 to move, including vibrate, within the cavity 108.

In an alternative or additional aspect, instead of using adhesive or adhesive layer 112, the flange area 114 of the top housing portion 102 may be joined to the bottom housing portion 104 by other techniques, such as but not limited to sonic welding, press fitting both housing layers into multiple cavities, crimping together the flange area 114 of the top housing portion 102 and a corresponding edge area of the bottom housing portion 104, applying an adhesive layer on the outside surface of the flange area 114 of the top housing portion 102 and a corresponding edge area of the bottom housing portion 104, etc.

Figure 6:
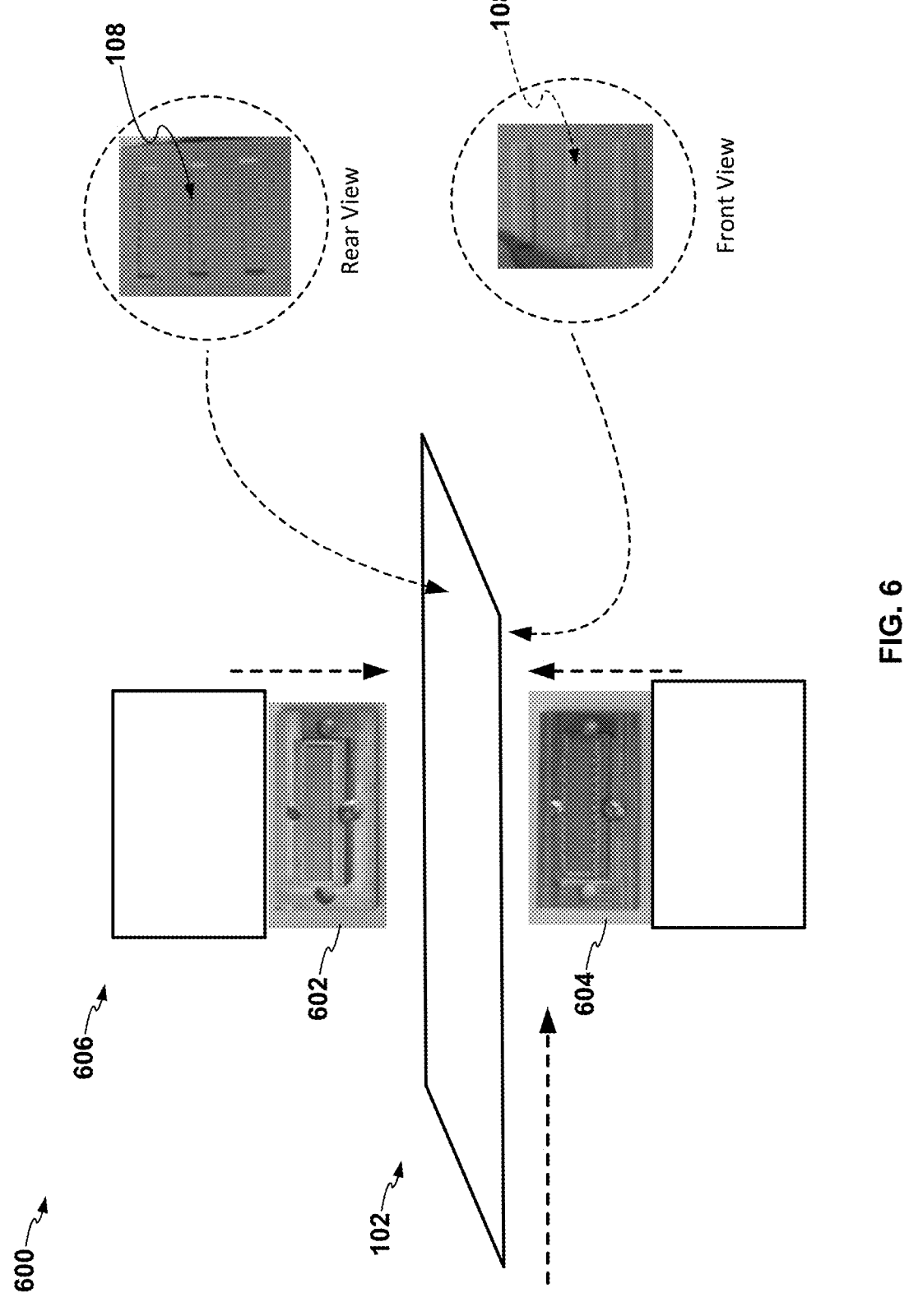
FIG. 6 is an example mold for the production of bio-degradable acousto-magnetic labels according to an aspect of the disclosure.

Referring specifically to FIG. 6, to form the cavity 108 of the top housing portion 102, a sheet or roll of the bio-degradable material may be subject to a pressing or stamping process 600. For instance, in one implementation, which should not be construed as limiting, a sheet of the bio-degradable material 601 for the top housing portion 102 is placed between a first die 602 that includes a shape corresponding to the cavity 108 and a second die 604 that includes a corresponding shape to fill the cavity 108 but leave room for the bio-degradable material. A press or stamping machine 606 then operates to press together the corresponding dies 602, 604 to form the cavity 108 in the bio-degradable sheet of material, which is pre-sized or can be cut to size to form top housing portion 102. In some aspects, one or both of the dies 602, 604 may utilize rounded edges to prevent damage to the cavity 108 when implementing a dry press formation process. For example, in some aspects, if sharp edges are used during the formation of the cavity 108, then the bio-degradable material are subject to tear, or lose structural integrity. In one aspect of the disclosure, the rounded edges may have a radius between 0.2 mm and 0.9 mm, and more specifically, 0.45 mm. Additionally, in an aspect, the portion of the dies 602, 604 that forms the cavity 108 may have a draft angle (relative to being perpendicular to a plane of the tag/label) to help to form the cavity 108. For example, the draft angle may be in the range of 0.5 degrees to 2.5 degrees, or more preferably in the range of 1.0 degree to 2.0 degrees, or even more preferably about 1.5 degrees (plus or minus typical manufacturing toler-ances). As such, the cavity 108 may be formed with the same and/or a similar angle. In other words, the draft angle helps to prevent breakdown of the bio-degradable material during formation of the cavity 108, and the walls of the cavity angle inward from the base of the AM label 100 to the opposing wall of the cavity 108.

When forming the top housing portion 102, multiple top housing portions 102 may be produced at once, either in a row or in rows and columns, depending on the configuration of the dies 602, 604, which allows for mass production. In one aspect of the disclosure a plurality of top housing portion 102 may be pressed at once, as illustrated by the bottom sheet in FIG. 7, described below.

Figure 7:
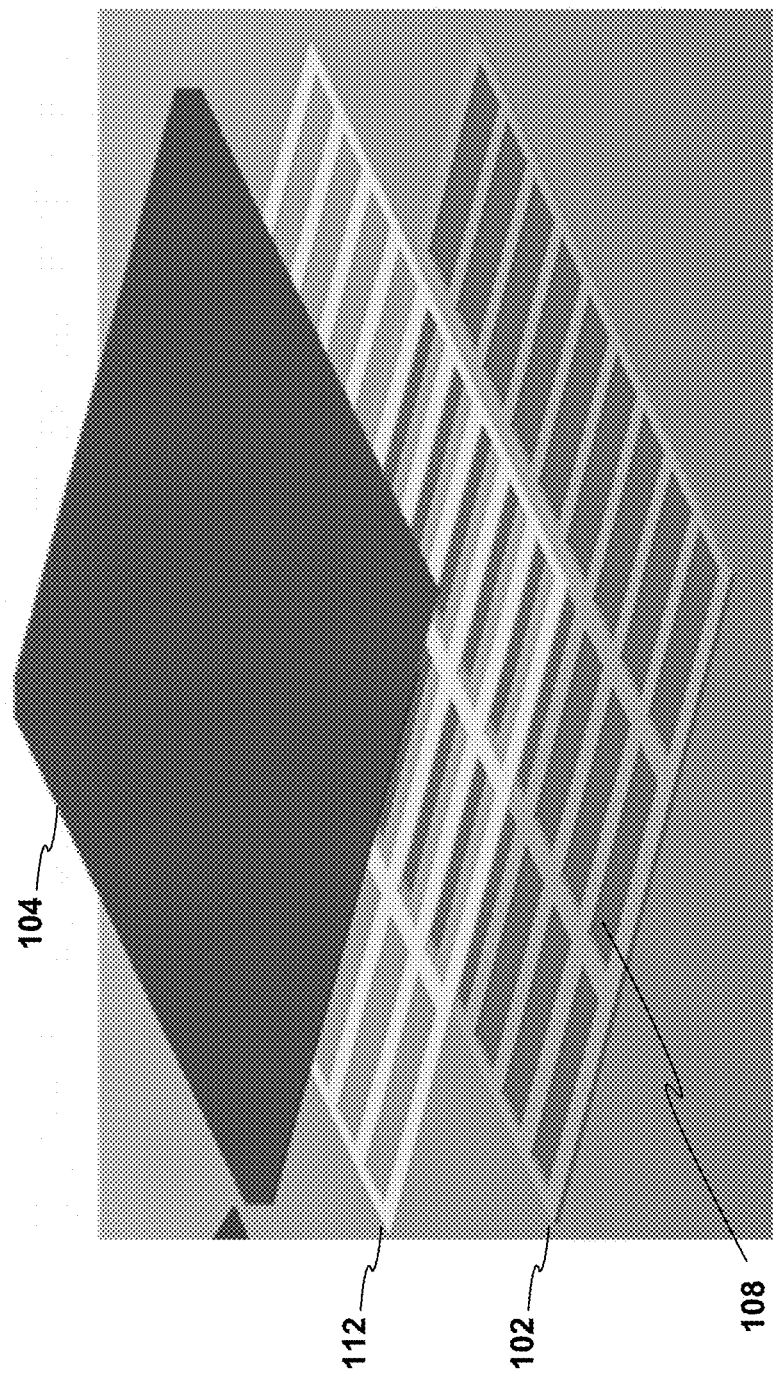
FIG. 7 is an exploded perspective view of an example sheet of bottom housing portions, a sheet of an adhesive layer, and a sheet of top housing portions (with resonators removed for clarity), wherein the sheets of the top and bottom housing portions are fixedly attached together by the adhesive layer, thereby forming a plurality of bio-degradable acousto-magnetic labels according to an aspect of the disclosure.

Referring to FIG. 7, is an exploded perspective view of illustrating an example sheet of bottom housing portions 104, a sheet of an adhesive layer 112, and a sheet of top housing portions 102 (with resonators removed for clarity), wherein the sheets of the top and bottom housing portions are fixedly attached together by the adhesive layer, thereby forming a plurality of bio-degradable acousto-magnetic labels. In the assembly process, the sheet of top housing portions 102 created by the die can be assembled into full AM housing members. As described above, in one aspect of the disclosure, the sheet of top housing portions 102 may be adhered, using a heat based adhesive 112, to a second sheet of paper, which forms the bottom housing portion 104. The adhesive 112 may be placed onto the bottom housing portion 104 and the bottom housing portion 104 is placed over the cavity 108 of the top housing portion 102, or plurality of cavities 108 of the plurality of top housing portions 102. A heated plate is then pressed onto the top and bottom housing portions 102, 104, which cures the adhesive 112, and secures the top housing portion 102 to the bottom housing portion 104. In one aspect of the disclosure, the heating plate may also be a heating roller or any form of a heating surface. This in turn encloses the cavity 108 and secures the members of the AM label such as the resonator within the cavity 108.

Once the heating and curing of the adhesive 112 has been completed, a sheet of fully formed and sealed AM labels is the result. The sheet of AM labels may then be cut, manually or automatically, via a laser, a blade or any sharp device as known in the art, into individual AM labels. In accordance with one aspect of the disclosure, the AM labels may be formed as a sheet as illustrated in FIG. 7, or a roll of AM labels, or the like.

Referring now to FIG. 8, an exemplary method 800 of producing AM labels is shown and described. As described above with relation to FIG. 6, the first step 802 includes placing a sheet of bio-degradable material 601 within the first die 602 and the second die 604 and pressing the brass die 602 and 604 together to form the top housing portion 102.

Additionally referring to step 802, the brass die can be structured to create cavities 108 of different sizes and in turn AM labels of varying lengths and widths. An exemplary width for a wider paper AM label could include a width of 12.420 mm and a length of 46.43 mm. Alternatively a width of a narrowed AM label could have a width of 8.402 mm and a length of 46.43 mm. In another aspect of the disclosure, the AM label may be smaller than or equal to 16 mm wide and a length of 55 mm. Using a dies as discussed in step 802, allows for AM labels of varying sizes to be produced at a high volume and in an efficient manner.

In step 804, of the method 800, a resonator 106 is placed within the cavity 108 of the top housing portion 102. Different AM label parts may be used in this step for different applications. For example, if an AM label is pro-duced with additional security measures these elements may also be arranged within the cavity 108 of the top housing portion 102.

Step 806 of the method 800 includes coating a second sheet of paper with a heat activated adhesive to form the bottom housing portion 104. In this step a second sheet of bio-degradable material is used, which may be the same as or different from the material used to create the top housing portion 102. This sheet of bio-degradable material may have a heat-based adhesive applied to the surface. Alternatively heat sealable kraft paper may be used, which is a paper with a coating of a water-based adhesive activated by heat. The use of the heat sealable kraft paper would eliminate the need to apply adhesive to each sheet of paper during the produc-tion process as this paper would have a pre-applied adhesive coating.

Steps 808 and 810 of the method 800 include placing the second, adhesive coated sheet of paper onto the top housing portion 102 and applying a heated plate to the top housing portion 102 and the bottom housing portion 104 to adhere the top housing portion 102 to the bottom housing portion 104, thereby encapsulating the resonator within the cavity 108 of the top housing portion 102 and the bottom housing portion 104. In steps 808 and 810, the bottom housing portion 104, or the second sheet of paper coated with the adhesive, is placed in such a manner as to cover the cavity 108 of the top housing portion 102. This secures all of the elements of the AM label within the top and bottom housing portions 102, 104. Heat may then be applied to the top and bottom housing portions 102, 104. The heating may be applied using a heating plate, which is pressed against either the top housing portion 102 or the bottom housing portion 104 to cure the adhesive. Alternative heat methods may also be utilized, which conform to the heating properties of the materials used to form the top and bottom housing portions 102, 104.

In an alternative or additional aspect, the method 800 may further include affixing a bias magnet the first housing portion or the second housing portion, outside of the cavity, as described above.

The present disclosure may additionally include one or more aspects based on the following clauses.

Clause 1. An acousto-magnetic (AM) label, comprising: a first housing portion comprising a first bio-degradable mate-rial and having a side wall defining a cavity; a second housing portion comprising a second bio-degradable mate-rial and connected to the first housing portion; and an acousto-magnetic resonator sized to moveably fit within the cavity.

Clause 2. The AM label of clause 1, wherein one or both of the first bio-degradable material and the second bio-degradable material comprises a non-white paper.

Clause 3. The AM label of any preceding clause, wherein one or both of the first bio-degradable material and the second bio-degradable material comprises cellulose fibers.

Clause 4. The AM label of any preceding clause, wherein one or both of the first bio-degradable material and the second bio-degradable material has a thickness of 15 to 45 points, wherein each point is 1/1000th of an inch.

Clause 5. The AM label of any preceding clause, wherein the second housing portion is flat paper.

Clause 6. The AM label of any preceding clause, wherein the cavity has a draft angle in a range of 0.5 degrees to 2.5 degrees.

Clause 7. The AM label of any preceding clause, wherein the cavity has a depth of 1.0 to 1.2 mm, and the first housing portion and the second housing portion include a width of 12.420 mm and a length of 46.43 mm.

Clause 8. The AM label of any preceding clause, wherein the second housing portion is sealingly mated to a flange of the first housing portion thereby forming the cavity as a sealed cavity between the first housing portion and the second housing portion.

Clause 9. The AM label of any preceding clause, further comprising a bias magnet attached to the first housing portion or the second housing portion, outside of the cavity.

Clause 10. The AM label of any preceding clause, further comprising an adhesive layer between the first housing portion and the second housing portion.

Clause 11. The AM label of any preceding clause, wherein the side wall extends non-linearly in a defined pattern.

Clause 12. The AM label of any preceding clause, wherein the first bio-degradable material is a same material as the second bio-degradable material.

Clause 13. The AM label of any preceding clause, wherein one or both of the first bio-degradable material and the second bio-degradable material comprises a non-white paper having a thickness of 20 to 40 points, or of 25 to 35 points, wherein each point is $\frac{1}{1000}$th of an inch, wherein the cavity has a draft angle in a range of 0.5 degrees to 2.5 degrees, and further comprising an adhesive layer between the second housing portion and a flange of the first housing portion.

Clause 14. A method of producing an acousto-magnetic (AM) label, comprising: forming a first housing portion comprising a first bio-degradable material and having a side wall defining a cavity; forming a second housing portion comprising a second bio-degradable material and connected to the first housing portion; and placing an acousto-magnetic resonator within the cavity, wherein the acousto-magnetic resonator is sized to be moveably within the cavity.

Clause 15. The method of any preceding clause, wherein one or both of the first bio-degradable material and the second bio-degradable material comprises a non-white paper.

Clause 16. The method of any preceding clause, wherein one or both of the first bio-degradable material and the second bio-degradable material comprises a non-white paper having a thickness of 15 to 45 points, wherein each point is $\frac{1}{1000}$th of an inch.

Clause 17. The method of any preceding clause, wherein forming the first housing portion includes placing a first sheet of the first bio-degradable material between a first die and a second die and pressing together the first die and the second die to form a sidewall defining the cavity in the first housing portion.

Clause 18. The method of clause 17, wherein the first die and the second die have a draft angle in a range of 0.5 degrees to 2.5 degrees.

Clause 19. The method of clause 18, wherein dies have rounded edges having a radius between 0.2 mm and 0.9 mm.

Clause 20. The method of clause 18, wherein forming the second housing portion comprises applying an adhesive layer to a second sheet of the second bio-degradable material.

Clause 21. The method of clause 18, further comprising sealingly connecting the second housing portion to a flange of the first housing portion to further define the cavity as a sealed cavity between the first housing portion and the second housing portion.

Clause 22. The method of any preceding clause, further comprising affixing a bias magnet to the first housing portion or the second housing portion, outside of the cavity.

Clause 23. The method of any preceding clause, wherein the first bio-degradable material is a same material as the second bio-degradable material.

In general, the description of the aspects disclosed should be considered as being illustrative in all respects and not being restrictive. The scope of the present disclosure is shown by the claims rather than by the above description, and is intended to include meanings equivalent to the claims and all changes in the scope. While preferred aspects of the disclosure have been described above, it is to be understood that variations and modifications will be apparent to those skilled in the art without departing from the scope and spirit of the disclosure.

The invention claimed is:

1. An acousto-magnetic (AM) label, comprising:
   a first housing portion comprising a first bio-degradable material and having a side wall defining a cavity;
   a second housing portion comprising a second bio-degradable material and connected to the first housing portion; and
   an acousto-magnetic resonator sized to moveably fit within the cavity,
   wherein the cavity has a draft angle in a range of 0.5 degrees to 2.5 degrees.

2. The AM label of claim 1, wherein one or both of the first bio-degradable material and the second bio-degradable material comprises a non-white paper.

3. The AM label of claim 1, wherein one or both of the first bio-degradable material and the second bio-degradable material comprises cellulose fibers.

4. The AM label of claim 1, wherein one or both of the first bio-degradable material and the second bio-degradable material has a thickness of 15 to 45 points, wherein each point is $\frac{1}{1000}$th of an inch.

5. The AM label of claim 1, wherein the second housing portion is flat paper.

6. The AM label of claim 1, wherein the cavity has a depth of 1.0 to 1.2 mm, and the first housing portion and the second housing portion include a width of 12.420 mm and a length of 46.43 mm.

7. The AM label of claim 1, wherein the second housing portion is sealingly mated to a flange of the first housing portion thereby forming the cavity as a sealed cavity between the first housing portion and the second housing portion.

8. The AM label of claim 1, further comprising a bias magnet attached to the first housing portion or the second housing portion, outside of the cavity.

9. The AM label of claim 1, further comprising an adhesive layer between the first housing portion and the second housing portion.

10. The AM label of claim 1, wherein the side wall extends non-linearly in a defined pattern.

11. The AM label of claim 1, wherein the first bio-degradable material is a same material as the second bio-degradable material.

12. The AM label of claim 1, wherein one or both of the first bio-degradable material and the second bio-degradable material comprises a non-white paper having a thickness of 20 to 40 points wherein each point is $\frac{1}{1000}$th of an inch, and further comprising an adhesive layer between the second housing portion and a flange of the first housing portion.

13. A method of producing an acousto-magnetic (AM) label, comprising:
   forming a first housing portion comprising a first bio-degradable material and having a side wall defining a cavity;

forming a second housing portion comprising a second bio-degradable material and connected to the first housing portion; and placing an acousto-magnetic resonator within the cavity, wherein the acousto-magnetic resonator is sized to be moveably within the cavity, wherein the cavity has a draft angle in a range of 0.5 degrees to 2.5 degrees.

14. The method of claim 13, wherein one or both of the first bio-degradable material and the second bio-degradable material comprises a non-white paper.

15. The method of claim 13, wherein one or both of the first bio-degradable material and the second bio-degradable material comprises a non-white paper having a thickness of 15 to 45 points, wherein each point is $\frac{1}{1000}$th of an inch.

16. The method of claim 13, wherein forming the first housing portion includes placing a first sheet of the first bio-degradable material between a first die and a second die and pressing together the first die and the second die to form a sidewall defining the cavity in the first housing portion.

17. The method of claim 16, wherein the first die or the second die comprise rounded edges having a radius between 0.2 mm and 0.9 mm.

18. The method of claim 13, wherein forming the second housing portion comprises applying an adhesive layer to a second sheet of the second bio-degradable material.

19. The method of claim 13, further comprising sealingly connecting the second housing portion to a flange of the first housing portion to further define the cavity as a sealed cavity between the first housing portion and the second housing portion.

20. The method of claim 13, further comprising affixing a bias magnet to the first housing portion or the second housing portion, outside of the cavity.

21. The method of claim 13, wherein the first bio-degradable material is a same material as the second bio-degradable material.

* * * * *